May 29, 1928.
W. DUBILIER
1,671,519
ELECTRICAL CONDENSER
Filed July 19, 1924
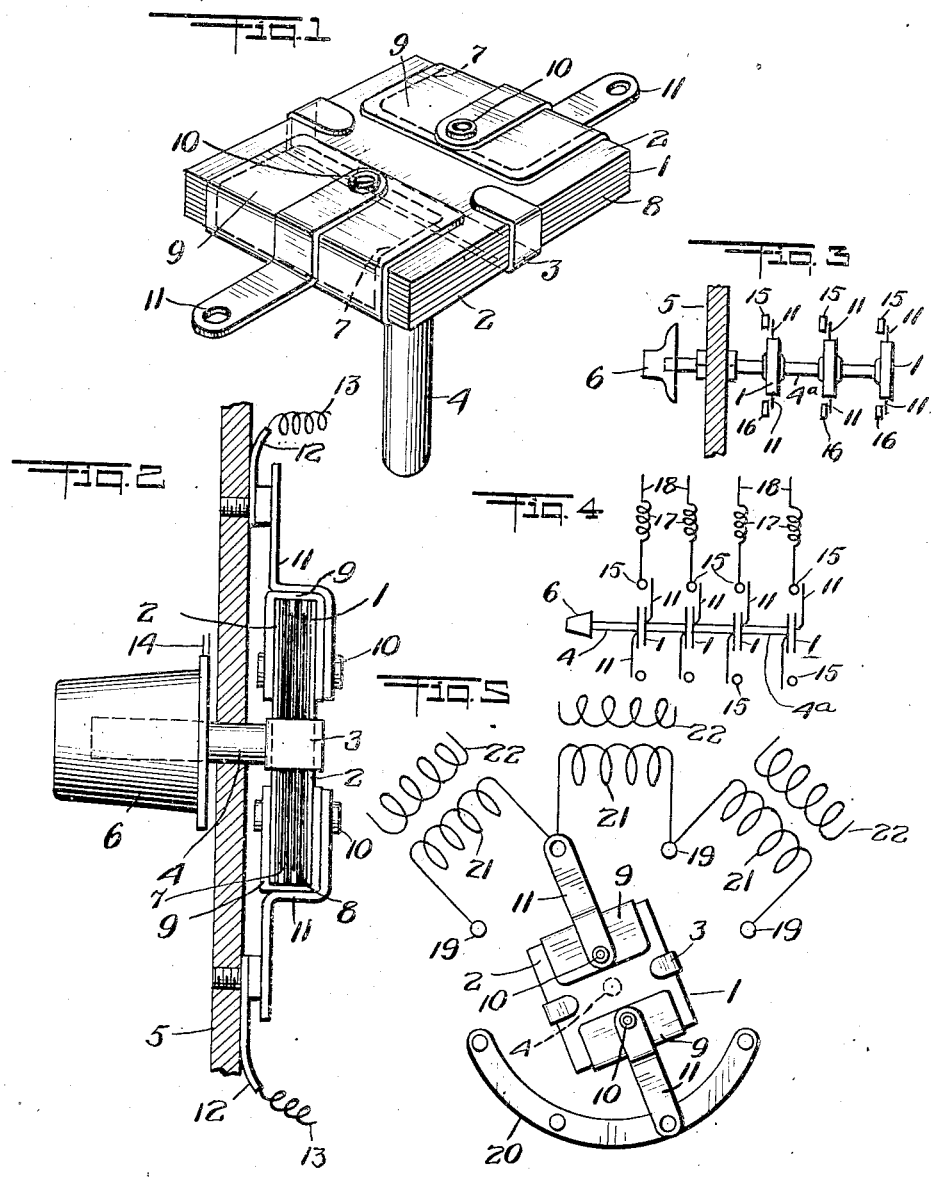
INVENTOR
William Dubilier
BY
ATTORNEY Patented May 29, 1928.

1,671,519

UNITED STATES PATENT OFFICE.

WILLIAM DUBILIER, OF NEW YORK, N. Y., ASSIGNOR TO DUBILIER CONDENSER CORPORATION, OF NEW YORK, N. Y., A CORPORATION OF DELAWARE.

ELECTRICAL CONDENSER.

Application filed July 19, 1924. Serial No. 727,018.

This invention relates to improvements in electrical condensers; especially condensers to be connected into circuit with electrical apparatus when capacity is wanted for tuning and other purposes.

An object of the invention is to provide a condenser which has the capacity needed and is designed to be easily manipulated to give the desired results.

The nature and advantages of the invention are set forth in the following description, taken in connection with the accompanying drawings, whereon:

Figure 1 is a perspective view of one embodiment of a condenser according to my invention;

Figure 2 is a side view, partly in section, showing such a condenser mounted; and Figures 3, 4 and 5 are views indicating the manner of use of my invention.

The same numerals identify the same parts throughout.

In the particular description of what the drawings present, I show a condenser having a body 1 comprising a pair of cover plates 2 between which are the sheets of the electrically conductive material separated by insulation; and affixed to the body and engaging both the cover plates is a clamp 3 which grips the body firmly and is made rigid with a stem or shaft 4. This shaft is affixed to the middle of the clamp and extends laterally away from same in a direction substantially perpendicular to one of the plates 2. By means of this shaft, the condenser can be rotatably mounted upon a panel 5, and provided with a knob 6, to enable the condenser to be actuated.

Between the cover plates 2, which may be of any suitable material, are the sheets of electrically conductive material, such as metal foil 7, separated by sheets or plates of mica 8, the opposite ends of the body 1 being received between electrically conductive or metallic clips 9, and one-half of the sheets of foil 7 may project at one end of the body and be bent over upon one of the cover plates 2, and be held by one of the clips 9; while the remaining sheets of foil 7 have projections at the opposite end of the condenser which are likewise turned down beneath the other clip. These clips may be secured by eyelet rivets 10 which pass through the clips 9 and the body 1, so that the condenser can be placed in circuit by connecting conductors to these two clips. As will be understood, the foils 7 which project at one end of the condenser and are held in contact with the clip 9 thereat, will not make contact with the rivet 10 which passes through the other clip 9 and body 1 at the opposite end of the condenser, but will be recessed adjacent this opposite end, so as to enable the rivet thereat to clear said sheets of foil; and similarly, the sheets of foil which project at the opposite end and are in contact with the adjacent metal clip 9, will be recessed so that there will be no contact between them and the first rivet. Hence, half of the sheets of foil 7 will be joined to one pole or terminal of the condenser, and the remaining half will be joined to the other pole or terminal of the condenser; and the two halves will be electrically insulated from each other. To each end of the condenser, I secure a contact arm or switch blade 11, these contact arms being made fast by the rivets 10; and being bent so that they extend away from the two opposite ends of the condenser in a direction which is generally parallel to the plane of the plates 2. These arms 11, when the condenser is in the necessary position, will connect the condenser to a pair of contacts 13 made fast to the panel 5, each of these contacts being joined to a wire 13 of the circuit in which the condenser is to be placed; and the knob 6 may have a pointer 14 to cooperate with a dial on the panel, and thus indicate the positions to which the condenser may be moved.

As indicated in Figure 2, the condenser and the contacts 12 can be at one side of the panel; while the knob is on the other. When the condenser is to be placed in circuit, the knob is turned to bring the condenser into position to bridge it across the contacts 12 by means of the switch blades 11; and to disconnect the condenser, the operator merely turns the knob to move the arms 11 away from the contacts.

In Figure 3, I show diagrammatically several of such condensers mounted upon a single shaft 4; such a construction can be obtained by making the clamp 3 extend entirely around the body 1 and making this clamp rigid with shaft sections 4ª extending from both cover plates 2. The clamp may be of metal or some other substance and if it is metallic it must, of course, be electrically separated from the edges of the clips 9 and far enough from them to avoid sparking or the discharge of the condenser between the opposed edges of the two clips through the clamp. Obviously, if the condenser nearest the panel in Figure 2 is provided with two shafts secured to the clamp 3 on both faces or cover plates 2, these shafts being in alinement, one can project through the panel to receive the knob, and the other shaft be made rigid with the clamp of the next condenser, and this next condenser can be joined by similar length of shaft to the condenser on the opposite side of it. Thus as many condensers as may be desired, can be supported upon a single complete shaft, and each condenser will have the construction described above, in connection with Figures 1 and 2, and be provided with switch arms 11 joined to the opposite poles thereof, to put the condenser in circuit, and disconnect the same from the circuit. Above the line of condensers, will be contacts 15 and below the condensers will be contacts 16, each condenser being bridged across the space between one of the contacts 15 and one of the contacts 16, when the knob 6 is turned to move the condensers into position. By this means, several capacities can be switched into circuit at the same time, if the contacts 15 and 16 are all joined to one circuit, or into different circuits, if each contact 15 and its associate contact 16 is part of a separate circuit. Of course, the manner of connecting the shaft 4 to the clamp 3 of any one of the condensers is not a material part of this invention.

Figure 4 shows an arrangement of condensers supported upon a single shaft similar to that indicated in Figure 3, but with coils 17 joined to the contacts 15 and conductors 18 leading away from the opposite ends of the coils, and from the other contacts 16. The use of the combination shown in this view is the same as that shown in Figure 3.

Figure 5 shows a condenser similar to that of Figures 1 and 2, with one of the switch blades 11 adapted to make contact with any one of several contacts 19, arranged in a curved row and with the other switch blade 11 sliding along and in contact with an arc-shaped contact member 20. Between each pair of contacts 19, and in connection therewith, is a coil 21 and each of the coils 21 is in inductive relation to a coil 22. With this arrangement, the condenser can be turned to be included successively into several circuits. The connections for the circuits shown in Figure 5 can be made in any required manner, and the same condenser thus employed for any one of these circuits or even several of them combined.

In all forms herein set forth, a single condenser or several condensers can be operated with a single knob and shaft, in order to switch into the circuit or circuits provided, and to disconnect therefrom.

While I have shown several forms with which my invention may be practiced, I do not wish to be necessarily limited to the structural details actually illustrated, as I reserve the right to make changes to the full extent permitted by the scope of the appended claims.

Having described my invention, what I believe to be new and desire to secure and protect by Letters Patent of the United States is:—

1. A condenser having switch arms connected to the poles thereof, a shaft rigidly attached to the condenser and a pair of oppositely extending fixed terminals to be engaged by the switch arms when the condenser is actuated, to connect the condenser in circuit.

2. The combination of a condenser having a body, a clamp secured to the body and insulated from both terminals of the condenser, and a shaft affixed to the clamp to enable the condenser to be rotatably mounted so that its poles can be shifted into and out of contact with the terminals of an electric circuit.

3. The combination of a condenser having a body, a clamp engaging the body and insulated from both terminals of the condenser, a shaft rigid with the clamp and extending away from the body, and a pair of switch arms each united to one of the poles of the condenser, the shaft enabling the condenser to be rotatably mounted so that the switch arms can be shifted into and out of contact with the terminals of an electric circuit.

4. A condenser comprising a body, consisting of sheets of dielectric and conductive material, cover plates therefor, a clamp engaging the body and insulated from both terminals of the condenser, and a shaft affixed to the clamp and extending away from the body perpendicular to said cover plates, to enable the condenser to be rotatably mounted and shifted to carry the opposite poles of the condenser into and out of contact with the terminals of an electric circuit.

5. A condenser comprising a body having sheets of conductive material separated by insulation, cover plates therefor, switch arms united to the opposite poles of the condenser, a clamp engaging the body and insulated from both terminals of the condenser, and a shaft affixed to the clamp and projecting therefrom substantially perpendicular to the cover plates, to enable the condenser to be rotatably mounted, to carry the switch arms into and out of contact with the terminals of an electric circuit.

6. A movably mounted condenser, fixed terminals to be put in circuit with the opposite poles of the condenser, when the condenser is actuated, and one or more stationary coils in circuit with said terminals.

7. The combination of a rotatable shaft, one or more condensers on said shaft, means for rotatably mounting the shaft, switch arms connected to each of the poles of said condenser or condensers, and fixed terminals to be engaged by said switch arms.

Signed at New York, in the county of New York and State of New York, this 17th day of July A. D. 1924.

WILLIAM DUBILIER.